United States Patent [19]

Clevett et al.

[11] 4,130,106
[45] Dec. 19, 1978

[54] SOLAR STOVE

[76] Inventors: Merton L. Clevett; Mildred L. Clevett, both of 4685 S. Ogden St., Englewood, Colo. 80110

[21] Appl. No.: 780,288

[22] Filed: Mar. 23, 1977

[51] Int. Cl.² .............................................. F24J 3/02
[52] U.S. Cl. .................................. 126/270; 350/292; 220/4 F; 220/7
[58] Field of Search .................... 126/270, 271; 34/93; 350/292, 288, 298, 299; 220/4 F, 6, 7; 229/41 C, 41 D

[56]  References Cited
U.S. PATENT DOCUMENTS

| 3,025,851 | 3/1962 | Steinberg | 126/270 |
| 3,028,856 | 4/1962 | Daymon | 126/270 |
| 3,038,463 | 6/1962 | Daymon | 126/271 |
| 3,106,201 | 10/1963 | Steinberg | 126/270 |
| 3,712,139 | 1/1973 | Harvey | 220/71 |
| 3,896,786 | 7/1975 | Clevett | 126/270 |

Primary Examiner—Kenneth W. Sprague
Assistant Examiner—James C. Yeung
Attorney, Agent, or Firm—Kyle W. Rost

[57] ABSTRACT

A solar stove having a casing with four rectangular reflective panels foldably attached and surrounding the perimeter of the upper edge of the casing, the panels being foldable against the casing to form a neat package. Each panel is attached to an opposite panel by a flexible cord, the cords crossing each other when the panels are opened to aid the user in aiming the solar stove directly into the sun. Triangular panels are removably attached to the sides of adjacent rectangular panels to fill the space created when the rectangular panels are opened to approximately 45° past vertical. The oven is a drawer fitting in the casing and removable either horizontally or vertically, the drawer having multiple layer construction for heat retention and a dark interior surface for converting solar rays to heat.

3 Claims, 7 Drawing Figures

SOLAR STOVE

BACKGROUND OF THE INVENTION

1. Field of the Invention

The invention relates to a portable, self-contained solar cooking stove which is foldable into a neat compact unit, easily stored and quickly unfolded and assembled for use for solar cooking. The stove may be economically produced from paper cardboard and foil.

2. Description of the Prior Art

Solar stoves known in the prior art are provided with an open top box form oven, with petal shaped reflector panels extending upwardly from the oven. As shown in U.S. Pat. No. 3,898,786, ten of such petal form reflector panels were required to surround the oven and reflect solar heat into the oven. For folding the prior art structure into a compact unit for storage, the petal form reflector panels have not functioned as well as is possible with the reflector panels of the present invention.

In the prior art, it has been necessary to provide a hole in the window element covering the oven, said hole serving to receive a pin mounted vertically in the hole to be aligned with the sun by orienting the solar stove until the pin does not cast a shadow.

One of the objects of the invention is to improve the reflector panel constructions over the prior art, and another object is to eliminate the need for drilling a hole in the oven cover to receive the pin required in the prior art arrangement.

Another object is to provide an improved and novel oven construction.

SUMMARY OF THE INVENTION

The solar stove disclosed herein employs a drawer form of oven for containing the food to be cooked, the open top drawer being slidable in a casing which has an open top covered by transparent material. In one embodiment, the drawer-oven is slidable in a horizontal plane, and in another embodiment it is slidable vertically in the casing. The casing serves to contain and guide the oven, and also to insulate it and conserve the solar heat for its intended purpose.

Another feature of the invention is the provision of four reflector panels which are rectangular and flat in form, each as wide as one of the four vertical walls forming the oven casing. Thus only four reflector panels are required to completely surround the casing, and four intermediate triangularly shaped panels fill the spaces at the corners between rectangular panels when they are disposed at the angles preferably desired for use. The reflector panels opposite each other are joined by cords which cross each other above the center of the oven and thus provide a means for aligning the solar apparatus with the sun.

DESCRIPTION OF THE PREFERRED EMBODIMENT

Figure 1:
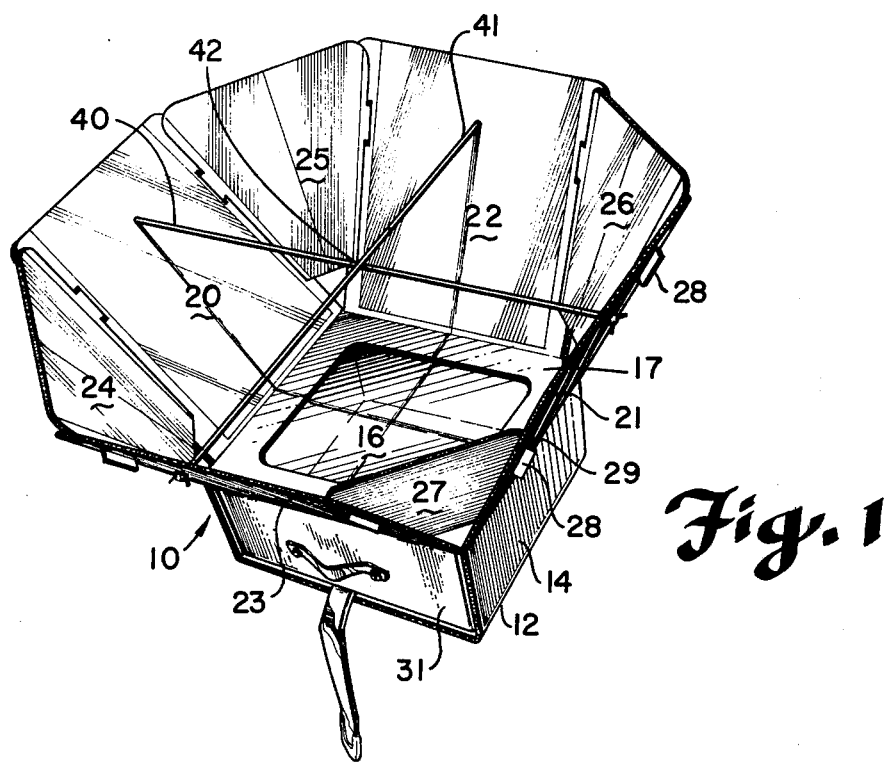
FIG. 1 is an isometric view of the solar stove embodying the invention, viewed from the front, one side and above, in operative position.

Referring to FIGS. 1-5, the solar stove 10 comprises a drawer casing 11 having a solid flat bottom 12, vertical side walls 13, 14, rear wall 15, and transparent flat top wall 16 mounted in a frame member 17. The drawer is the oven member of the stove. The vertical side walls 13, 14 are integral with the bottom 12 at opposite bottom side edges, and extend upwardly at their upper edges into reflector panels 20, 21, at opposite sides of the drawer casing 11. The casing vertical side walls, bottom and two reflector panels thus are made of an elongated rectangular piece of cardboard or the like suitable insulating material, bent transversely between its ends, to form part of the drawer casing and two of four reflector panels. Another reflector panel, 22, extends upwardly from the drawer casing rear wall 15, and a fourth reflector panel 23 extends upwardly from the forward edge of the frame member 17. The panels 20-23 are hingedly connected with the drawer casing 11 and are as wide as the casing members to which they are attached. The reflector panels are faced with reflective foil which may extend substantially over the entire width of each panel or close to the side edges thereof.

Figure 3:
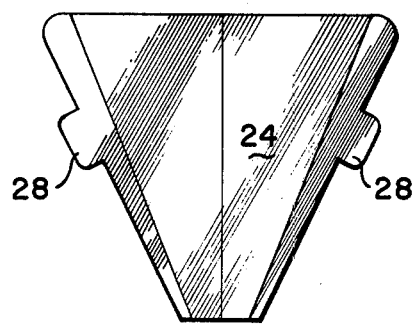
FIG. 3 is an elevational view of one of the four corner panels used in assembling the stove's reflector means.
Figure 4:
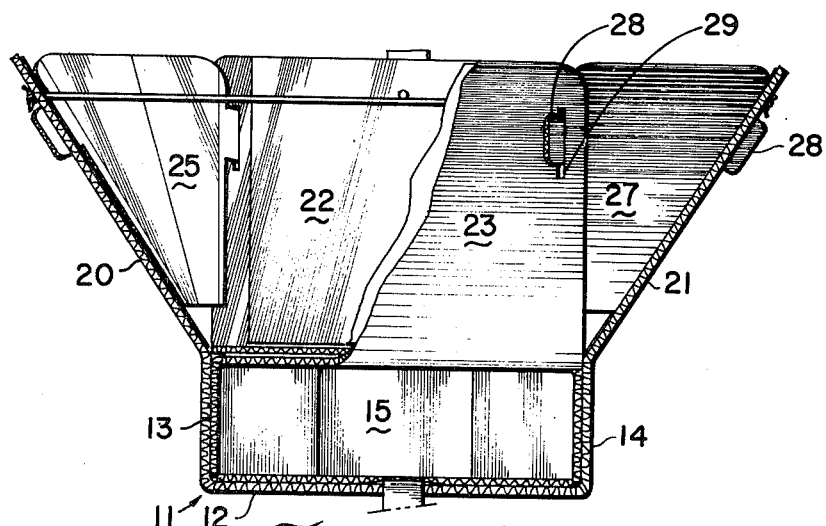
FIG. 4 is a vertical sectional view, partly in elevation, in planes extending transversely from side to side of the stove.

The reflector panels 20-23 are designed to extend at approximately 45 degrees to the horizontal drawer casing top, and thus form triangular openings between adjacent side edges of the panels. Four intermediate or corner panels 24, 25, 26 and 27 close the openings when mounted as shown, one triangular reflector panel between the side edges of two of the panels 20-23. Each corner panel, 24, 25, 26, 27, is provided with two tabs 28, on opposite side edges, as shown in FIG. 3, which engage slots 29 in the side edges of panels 20-23 and provide a continuous reflector surface extending upwardly from the oven drawer-casing.

Figure 5:
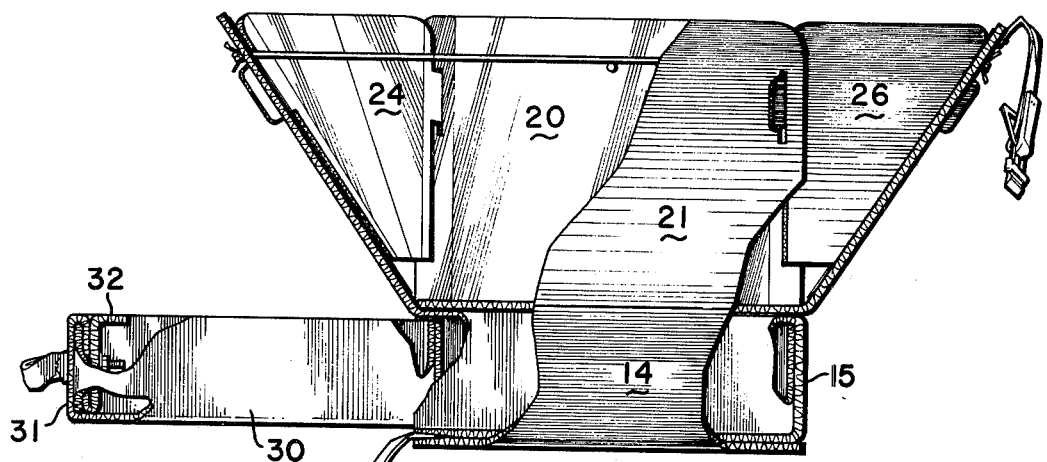
FIG. 5 is a view similar to FIG. 4, in planes extending from front to rear of the stove, with the drawer-oven in open position.
Figure 7:
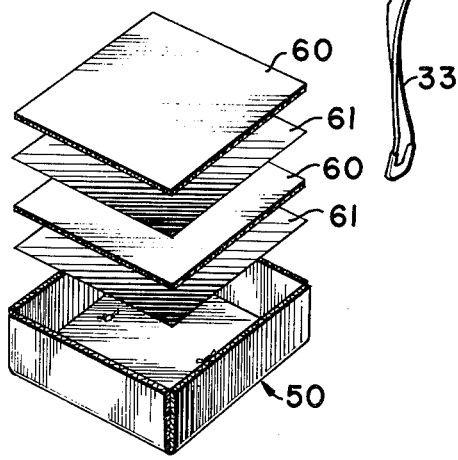
FIG. 7 is an isometric view of the drawer and of other parts of the stove of FIG. 6.

Within the drawer casing is a horizontally slidable drawer 30 made of cardboard or corrugated paper forming front, two side walls and rear and bottom walls lines interiorly with black or other dark coating which enhances the heating effect of the solar rays reflected by the panels 20-23 and 24-27. The front 31 of the drawer 30 has a horizontal strip 32 fastened to its upper edge to provide an insulating seal between the drawer and the atmosphere and conserve heat within the drawer in which food is being cooked. The drawer 30 fits neatly into the casing which also aids in insulating the drawer. With reference to FIG. 5, it will be observed that the front of the drawer, which is in direct contact with the outside of the oven, is the only element closing the open side of the drawer casing. The front side is formed from a greater number of layers of corrugated paperboard than the remaining sides of the drawer.

A flexible cord 40 is fastened at opposite ends, to reflector panels 20, 21, respectively, and a similar cord 41 is fastened to reflector panels 22, 23, respectively. The point of cross, 42, aids the user of the stove to judge the degree of tilting of the stove required for directing solar rays to the center of the drawer top and its transparent cover.

Figure 2:
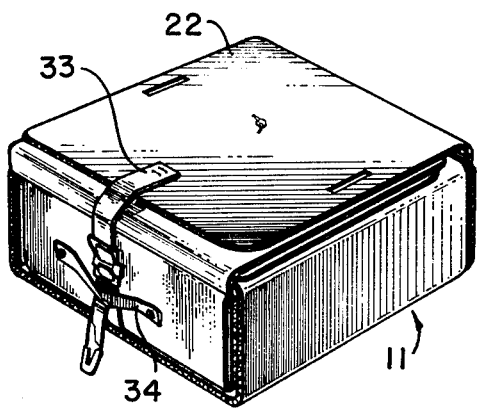
FIG. 2 is an isometric view of the stove of FIG. 1, in closed inoperative position.

As shown in FIG. 2, when not in use, the solar stove may be folded into a compact unit in which the triangular corner panels 24-27 are removed and placed in the drawer 30, the drawer is closed, reflector panels 20-23 successively folded at their hinged connections, the first one to rest on the drawer casing and the others on another panel. The panel 22 is provided with a tape strap 33 on its outer surface for engaging the handle 34 on on the drawer front to form an assembled package.

Figure 6:
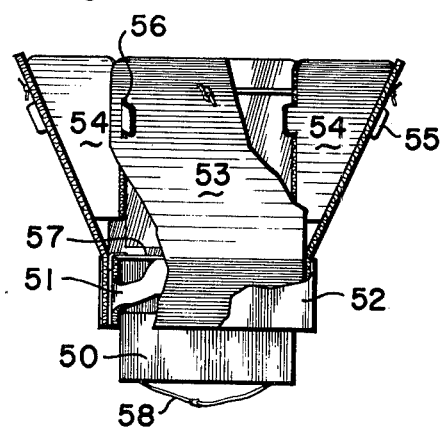
FIG. 6 is a vertical sectional view, partly in elevation, on a smaller scale than FIGS. 4 and 5, showing a modification of the invention, in which a food drawer is movable in vertical directions instead of horizontally.

Referring to the modification shown in FIG. 6, a smaller solar stove resembles the embodiment shown in FIGS. 1-5, except that the oven-drawer 30 has been replaced by a vertically movable drawer 50 removable from the drawer casing 51 which comprises four vertical walls 52 into which the drawer 50 fits snugly. The drawer casing walls 52 are connected to the four reflector panels 53 which resemble the panels 20-23 heretofore described. The panels 53 are spaced apart at their sides, when the panels extend at 45° angles to the horizontal, and intermediate triangular panels 54 are provided with tabs 55 which engage slots 56 to complete the reflector assembly which surrounds the oven drawer 50, and reflect solar rays to the transparent top 57 of the oven.

The drawer 50 has a handle 58 on its bottom to facilitate removal from the casing 52 by pulling downwardly on the handle. As shown in FIG. 6, the bottom of the oven drawer may be insulated by alternate layers of cardboard and foil, indicated at 60, 61, or by one or more layers of cardboard.

We claim:

1. A solar stove that is portable and foldable, comprising:
   (a) a box-like oven formed from multiple layers of corrugated paperboard for thermal insulation, the paperboard forming the bottom and four lateral side walls of the oven, and a transparent top face allowing radiant solar energy to be directed therein;
   (b) four rectangular corrugated paperboard reflector panels, each having a reflective covering thereon, one panel being integrally and hingedly attached to each of the four lateral sides of said oven and extending upwardly therefrom to direct solar energy through said transparent top, and
   (c) a cross-shaped member structurally joining opposite reflective panels and providing a sun sight for accurately aiming said transparent face of the oven at the sun.

2. The solar stove of claim 1, wherein said oven comprises:
   (a) a drawer casing having a rectangular bottom wall and three lateral side walls of corrugated paperboard, the fourth side being open, and closed on the upper side by said transparent top; and
   (b) an open topped drawer closely proportioned to fit within said drawer casing through said open fourth side to directly close same and having a bottom wall and four lateral sides of corrugated paperboard.

3. The solar stove of claim 2, wherein said drawer further comprises a designated front side wall adapted to close the open side of the casing and having a greater number of layers of corrugated paperboard than the remaining side walls thereof, and having a horizontal insulating strip along the top edge thereof for sealing the drawer against heat loss.

* * * * *